Patented Feb. 13, 1940

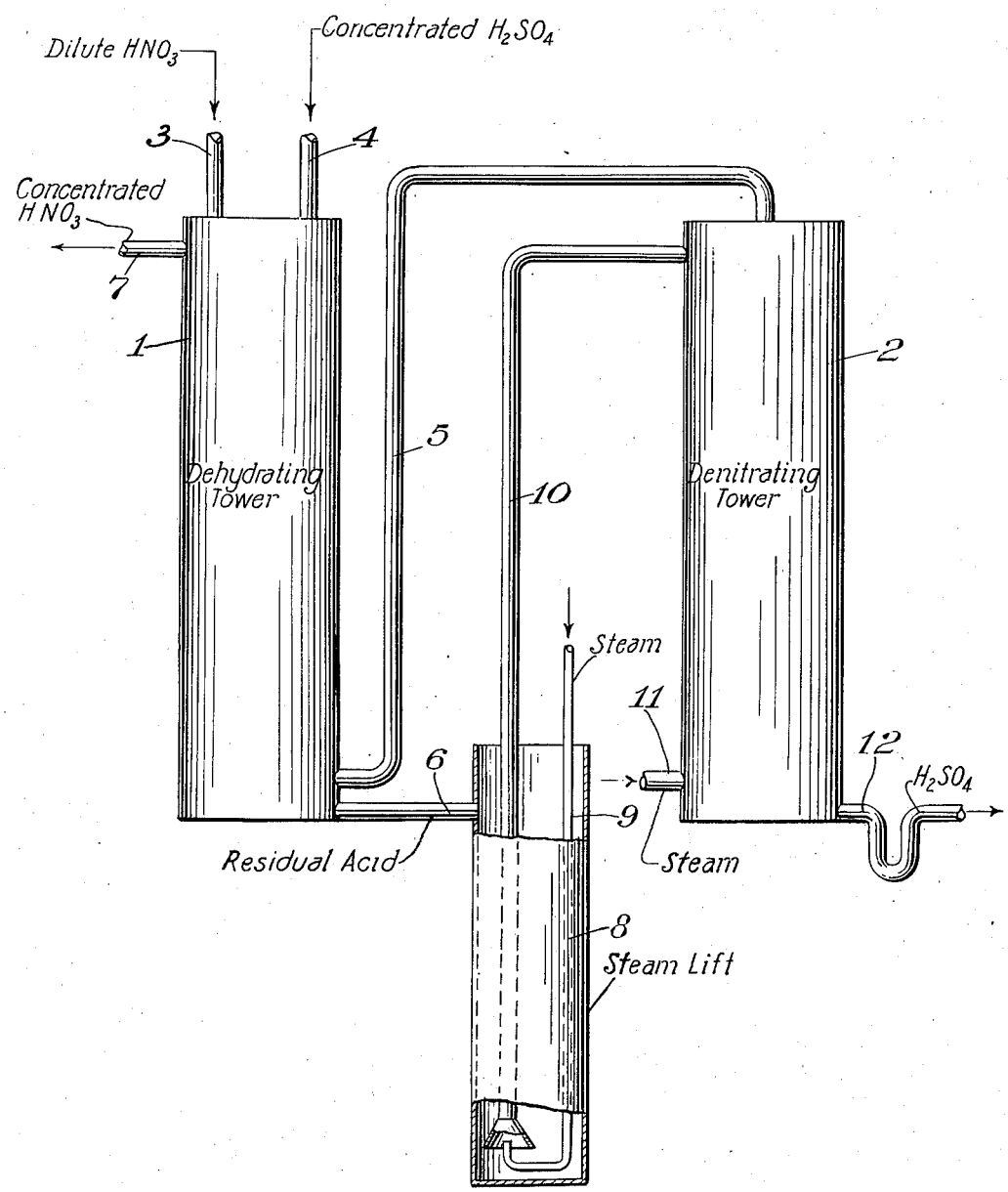

2,190,304

UNITED STATES PATENT OFFICE 2,190,304

CONCENTRATION OF NITRIC ACID

Frederick C. Zeisberg, Wilmington, Del., assignor to E. I. du Pont de Nemours & Company, Wilmington, Del., a corporation of Delaware Application June 3, 1936, Serial No. 83,262

3 Claims. (Cl. 23—160)

The present invention relates to the concentration of nitric acid by means of a dehydrating agent and more particularly to improved method and apparatus for nitric acid concentration wherein the pumping of corrosive material is reduced to a minium.

As is well known, nitric acid may be concentrated by continuously distilling the dilute acid in the presence of a dehydrating agent, preferably concentrated sulfuric acid. This is often effected in two stages, a dehydration stage, and a denitration stage. In the dehydration stage, the greater part of the nitric acid is distilled off at a high concentration. At the end of the dehydration stage, the sulfuric acid employed therein still has an appreciable nitric acid content, but has become so dilute that it lacks the power of further dehydration. Consequently, it must be made to undergo a reconcentration process. Before the sulfuric acid is reconcentrated, however, it is desirable to remove the small amount of nitric acid remaining therein. The denitration is often carried out in a zone connected in series with the dehydration zone. Such an arrangement may be illustrated by the processes disclosed in U. S. Patents 1,772,122 issued to Zeisberg; 1,878,676 issued to Cox, Kirst, and Woodbury; 1,922,289 issued to Handforth.

All of these processes contemplate the use of two towers in series, the bottom of the dehydrating tower being placed at a slightly higher elevation than the top of the denitration tower, so that the boiling residual acid flows from the bottom of the first tower by gravity into the top of the second tower, in some cases passing through intermediate apparatus on the way. This requires a considerable height of building and additional energy to deliver the feed liquid to the top of the first tower.

If the dehydrating tower is lowered, then it becomes necessary to raise the liquid discharged from the bottom of that tower in some positive manner to the top of the denitrating tower. Owing to the corrosive nature of the reactants, this operation has never been successfully and practically performed. Since the liquid to be raised constitutes a boiling mixture of sulfuric acid, nitric acid and water, with sufficient water being present to render it exceedingly corrosive, it is exceedingly hazardous to handle this liquid with pumps, even of the so-called acid-proof type, because of difficulty with the stuffing box.

Neither is it desirable to employ an airlift of acid-proof material because the air thus used, if introduced into the concentrating apparatus, tends to carry nitric acid through the condensers, and, if separated from the liquid before the liquid is reintroduced into the concentrating apparatus, carries nitric acid vapors away.

An object of the present invention is an improved process for the concentration of nitric acid by means of a dehydrating agent. A further object is such a process wherein the efficiency is increased by reducing to a minium the pumping of corrosive material therein. An additional object is a novel and improved apparatus for carrying out the above process. Other objects will be disclosed as my invention is further described hereinafter.

I have discovered that all the foregoing objects can be realized if steam is used to lift the corrosive boiling mixture of sulfuric acid, nitric acid, and water from the bottom of the dehydrating zone to the top of the denitrating zone. Because the liquid is already at its boiling point, the steam cannot condense, and behaves like the incondensable gas, air. The mixture of liquid and steam can be introduced directly into the concentrating apparatus where the liquid separates by gravity and flows down the second tower, while the steam joins the atmosphere of steam and nitric acid vapor already existing in the apparatus and thereafter behaves just like any other steam in the process.

While my invention is applicable to any process or system for the concentration of nitric acid by means of a dehydrating agent, for purposes of illustration, I shall describe its application to a system wherein a liquid dehydrating agent near its boiling point is mixed with weak nitric acid so as to utilize the heat of reaction, and the mixture is passed through a tower countercurrent to a gaseous medium inert with respect to said mixture and its constituents. Without restricting myself thereto, I shall describe the invention with particular reference to the apparatus diagrammatically illustrated in the accompanying drawing, which apparatus is particularly suitable for effecting the foregoing process and illustrating one embodiment of my invention.

The single figure of the drawing shows a diagrammatic side elevation of a nitric acid concentration plant in accordance with my invention. The dehydrating tower 1 is constructed of acid-proof material and is packed with suitable acid-proof packing. The denitrating tower 2 is of similar construction and is so placed with respect to tower 1 that the bottom of the latter tower is located substantially below the top of the denitrating tower. The dilute nitric acid to be concentrated is fed to the upper portion of the dehydrating tower at 3, and may be preheated if desired. The concentrated sulfuric acid is likewise introduced into the top of tower 1 at 4. The gases from the denitrating tower are introduced into the lower portion of the tower 1 through 5, and pass upward countercurrent to the descending mixture of acids. The nitric acid vapors forming in the tower 1 pass out through the conduit 7, which leads to a standard type of bleacher and condenser not shown. The residual acid passes from the bottom of the dehydrating tower 1 through the conduit 6 by gravitational flow into the steam lift 8. Steam is passed into the steam lift 8 through the line 9, which is preferably lagged, and causes the residual acid to flow upward through the conduit 10, which likewise is preferably lagged, into the top of the denitrating tower 2. The steam introduced through 11 into the base of the denitrating tower 2 passes upward in countercurrent relation to the down-flowing mixture of acids and removes therefrom the last traces of nitric acid. Denitrated sulfuric acid passes from the tower 2 through the trapped line 12. If desired, this hot sulfuric acid may be transferred to any desired point, for example, the sulfuric acid concentrator, by means of a steam lift similar to that represented by 8. The gases from tower 2 are led into the base of tower 1 through the conduit 5.

It is to be understood that the foregoing process and apparatus are introduced merely by way of illustration to clarify the nature of my invention by demonstrating an actual application of the same. Therefore, I do not intend to be limited to such embodiments but include within the scope of my invention the application of the concept thereof to any system for the concentration of nitric acid by means of a dehydrating agent and to any apparatus to be employed in such system. In particular, the invention is to be understood as applying to the process and type of apparatus employed in U. S. Patent 1,772,122, wherein the vapors of dilute nitric acid are introduced at one end of an unheated countercurrent of liquid dehydrating agent, and heat is abstracted from the extreme opposite end of the countercurrent system.

The invention is understood to apply also to the process and type of apparatus employed in U. S. Patent 1,922,289, wherein boiling vessels, or similar cascades are interposed between the dehydrating tower and the denitrating tower, to partially concentrate residual acid en route, while the weak nitric acid vapor driven off in the denitrating tower is returned to the dehydrating tower through said vessels. In the application of my invention to a process and apparatus of this type, it would be desirable to introduce the steam lift between the cascade and the denitrating tower and to return the weak nitric acid vapors from the denitrating tower to the foot of the dehydrating tower directly, by a vapor line or similar means known to the art.

In summary, my invention comprises conducting any nitric acid concentrating process in which boiling acid mixtures would normally run by gravity from one piece of apparatus to another, in such a manner that, instead, said mixtures are raised by steam from one apparatus to another with the result that many operating advantages are secured. The chief advantage in the use of the process or apparatus of my invention lies in the fact that the use of such a steam lift, which may be constructed of silicon-iron for example, permits the upper tower to be set at a much lower level. A new degree of safety and efficiency results thereby, through the reduction in the height of the building and operating platforms, and the reduction in the amount of energy necessary for pumping the initial liquids to the top of the first tower.

An additional advantage is that a certain amount of denitration occurs in the steam lift, which to that extent makes it possible to decrease the size of the denitrating tower and the steam supply normally admitted at the base of said denitrating tower.

A further advantage of my invention results from the fact that by the use of a steam lift, it is possible to avoid the hazards involved in handling a boiling mixture of nitric and sulfuric acids by means of pumps, the lubricating materials of which are capable of forming explosive mixtures with the boiling nitrating acid. Other advantages will be apparent to any one skilled in the art.

It is to be understood that numerous variations in detail may be effected therein without transcending the scope of my inventive concept. Thus, the principle of the steam lift according to my invention may be used with equal advantage in the handling of other corrosive aqueous solutions maintained at, or very close to, the boiling point thereof. In the foregoing example mention was made of the application of the steam lift to the boiling dilute sulfuric acid which flows from the bottom of the denitrating tower. It is equally apparent that the steam lift could be applied with advantage to transporting boiling dilute nitric acid, or to any other corrosive aqueous solution which was desirably handled while boiling. It will be apparent to any one skilled in the art that the principle of my invention may be applied to a great many boiling aqueous solutions of corrosive liquids, of which the following are cited by way of example: boiling aqueous solutions of phosphoric acid; constant boiling hydrochloric, hydrobromic, or hydroiodic acid; the lower aliphatic acids such as acetic acid, and their halogen substitution products, such as chloracetic acid; aryl sulfonic acids; amine hydrohalides, such as aniline hydrochloride; the halogen substitution products of acetaldehyde, such as chloral, bromal, and boiling solutions of strongly alkaline materials such as sodium hydroxide, potassium hydroxide, and quaternary ammonium bases such as benzyl trimethyl ammonium hydroxide and the like. Other applications will be apparent to any one skilled in the art. I, therefore, intend to be limited only according to the following claims.

I claim:

1. Apparatus for the concentration of nitric acid by means of a liquid dehydrating agent, which apparatus comprises a dehydrating chamber and a denitrating chamber, the lower portion of said dehydrating chamber being located at a substantially lower elevation than the upper portion of said denitrating chamber, a steam lift connecting the lower portion of said dehydrating chamber with the upper portion of said denitrating chamber, and a conduit connecting the upper portion of said denitrating chamber with the lower portion of said dehydrating chamber permitting the return of nitric acid vapors from said denitrating chamber to said dehydrating chamber.

2. In the process for the concentration of nitric acid by means of a dehydrating agent, the steps which comprise maintaining the dehydrating zone at substantially the same level as the denitration zone, elevating the residual liquid from the dehydration zone to the upper portion of the denitration zone by means of steam in direct contact with said residual liquid, passing additional steam up through said denitration zone, and returning the steam-containing vapors from the top of said denitration zone to said dehydration zone.

3. The process of claim 2 wherein the dehydrating agent comprises sulfuric acid.

FREDERICK C. ZEISBERG.